United States Patent
Wittmann et al.

(10) Patent No.: US 6,357,336 B1
(45) Date of Patent: Mar. 19, 2002

(54) OSCILLATING BEARING

(75) Inventors: Raphael Wittmann, Roth; Joseph Christophel, Durrenbach; Jean Louis Hoden, Lampertheim, all of (FR)

(73) Assignee: Ina Walzlager Schaeffler oHG (DE)

( * ) Notice: Subject to any disclaimer, the term of this patent is extended or adjusted under 35 U.S.C. 154(b) by 0 days.

(21) Appl. No.: 09/508,720

(22) PCT Filed: Sep. 5, 1998

(86) PCT No.: PCT/EP98/05637

§ 371 Date: Mar. 14, 2000

§ 102(e) Date: Mar. 14, 2000

(87) PCT Pub. No.: WO99/14492

PCT Pub. Date: Mar. 25, 1999

(30) Foreign Application Priority Data

Sep. 15, 1997 (DE) .......................... 197 40 436

(51) Int. Cl.[7] .................................. F01B 3/00
(52) U.S. Cl. ................................. 92/71; 74/60
(58) Field of Search .................. 92/71; 74/60; 91/499; 417/269; 384/477, 905.1

(56) References Cited

U.S. PATENT DOCUMENTS

| | | |
|---|---|---|
| 1,808,664 A | 6/1931 | Koschka |
| 2,437,207 A | 3/1948 | Noxon |
| 2,458,294 A | 1/1949 | Parker |
| 2,941,475 A * | 6/1960 | Blair .......................... 417/269 |
| 3,045,604 A * | 7/1962 | Hahn .......................... 74/60 |
| 3,514,223 A * | 5/1970 | Hare .......................... 417/269 |
| 3,628,838 A * | 12/1971 | Camosso et al. ........... 384/477 |
| 4,334,836 A * | 6/1982 | Kubis et al. ................ 417/364 |
| 5,836,749 A * | 11/1998 | Novacek et al. ............ 417/269 |

FOREIGN PATENT DOCUMENTS

| | | |
|---|---|---|
| DE | 220419 | 6/1910 |
| DE | 918129 | 9/1954 |
| DE | 943455 | 5/1956 |
| DE | 1966462 | 7/1964 |
| DE | 3700997 | 8/1987 |
| DE | 3724967 | 2/1989 |
| DE | 4235697 | 3/1994 |
| DE | 19515191 | 11/1995 |
| DE | 19613928 | 10/1997 |
| FR | 0687812 | 12/1995 |
| GB | 672173 | 5/1952 |
| GB | 1115744 | 5/1968 |
| GB | 1326070 | 8/1973 |

* cited by examiner

Primary Examiner—F. Daniel Lopez
(74) Attorney, Agent, or Firm—Bierman, Muserlian and Lucas

(57) ABSTRACT

An oscillating bearing arrangement, for axial piston pumps (1) of a wobble plate type, comprises a shaft (6) connected for rotation about its longitudinal axis (13) to a wobble plate, the shaft (6) being coupled with a shaft bearing (3) arranged in a housing (4) and comprises an inner ring (15) and an outer ring (16), and oscillating driven elements (14) being spring-suspended against the wobble plate characterized in that the wobble plate (23) which is substantially trapezoidal-shaped in longitudinal section is arranged concentrically in a reception bore of the inner ring (15) of the shaft (3).

8 Claims, 2 Drawing Sheets

OSCILLATING BEARING

FIELD OF THE INVENTION

The invention concerns an oscillating bearing arrangement, particularly for axial piston pumps of a wobble plate type, comprising a shaft connected for rotation about its longitudinal axial to a wobble plate, the shaft being coupled with a shaft bearing arranged in a housing and comprising an inner ring and an outer ring, and oscillating driven elements being spring-suspended against the wobble plate.

BACKGROUND OF THE INVENTION

An axial piston pump having an oscillating bearing arrangement of the pre-cited type is known from FR 27 21 352. The shaft connected to the wobble plate is mounted for rotation by two spaced-apart shaft bearings each of which comprises an inner ring and an outer ring. When the shaft is driven, its rotary motion is converted into a reciprocating motion by the wobble plate.

A drawback of this is that the wobble plate is arranged outside of the shaft bearing in axial direction, so that high forces of tilt arise which have to be taken up by a second shaft bearing. This arrangement of the shaft bearings and the wobble plate results in a large axial design space requirement.

SUMMARY OF THE INVENTION

The object of the invention is to create an oscillating bearing arrangement whose axial design space requirement is as small as possible.

The invention achieves the object wherein an oscillating bearing arrangement, for axial piston pumps (1) of a wobble plate type, comprises a shaft (6) connected for rotation about its longitudinal axis (13) to a wobble plate, the shaft (6) being coupled with a shaft bearing (3) arranged in a housing (4) and comprises an inner ring (15) and an outer ring (16), and oscillating driven elements (14) being spring-suspended against the wobble plate by the fact that the wobble plate which is substantially trapezoidal-shaped in longitudinal section is arranged concentrically in the reception bore of the inner ring of the shaft bearing.

The shaft is connected to the inner ring and/or to the wobble plate by a coupling element. This facilitates the assembly of the oscillating bearing arrangement.

The inner ring is configured as a pot-shaped sheet metal part made by non-chipping shaping and comprising a tubular section which is parallel to the longitudinal axis of the shaft and comprises a ball race groove formed chiplessly therein. The tubular section is closed at one end by a bottom which comprises a recess for the coupling element.

Due to the inventive arrangement of the wobble plate within the pitch circle diameter of the rolling elements of the oscillating bearing, the static and dynamic conditions are improved because the center point of the bearing and the point of application of the force resultant on the wobble plate approach each other. Due to the lodging of the wobble plate in the inner ring, the diameter of the shaft bearing is increased so that higher dynamic and static basic load ratings are also achieved. In addition, the construction of the invention has a substantially reduced axial design space requirement because, compared to the prior art, lower forces of tilt occur so that one of the shaft bearings can be omitted.

Further advantageous features of the invention are described in claims 2 to 8.

According to claim 2, the shaft is connected to the inner ring and/or to the wobble plate by a coupling element. This facilitates the assembly of the oscillating bearing arrangement.

According to claim 3, the inner ring is configured as a pot-shaped sheet metal part made by non-chipping shaping and comprising a tubular section which is parallel to the longitudinal axis of the shaft and comprises a ball race groove formed chiplessly therein. The tubular section is closed at one end by a bottom which comprises a recess for the coupling element.

Such an inner ring is not only simple and economical to manufacture because of being made by non-chipping shaping, but it also has the advantage that its outer surface which is in contact with a sealing lip of a seal is sufficiently smooth and thus does not need to be finished by machining.

The same advantages are also obtained with an outer ring which is likewise configured as a sheet metal part which is made by non-chipping shaping and comprises a ball race groove formed chiplessly on its inner peripheral surface, and a sealing ring is arranged between the inner ring and the outer ring. It is, of course, also possible to make the bearing rings by a chipping method.

According to a further feature of the invention, the wobble comprises, on its end face facing the bottom, a recess for the coupling element, and, on its end face facing the driven elements, a cover plate.

The wobble plate and/or the cover plate can be made of different materials and by different manufacturing methods. They are made of a metal or a plastic by machining, casting, sintering or injection molding.

According to another feature of the invention, an anti-rotation device is arranged between the inner ring and the wobble plate to prevent an undesired rotation of the wobble plate in the inner ring.

Finally, according to still another feature of the invention, the axial piston pump is used for a direct injection of fuel, and the shaft is a camshaft of an internal combustion engine. This has the advantage that no additional drive is required for the axial piston pump and the oscillating bearing arrangement of the invention has a particularly small construction space required in the automobile.

The invention will now be described more closely with reference to the following example of embodiment.

DETAILED DESCRIPTION OF THE DRAWINGS

Figure 1:
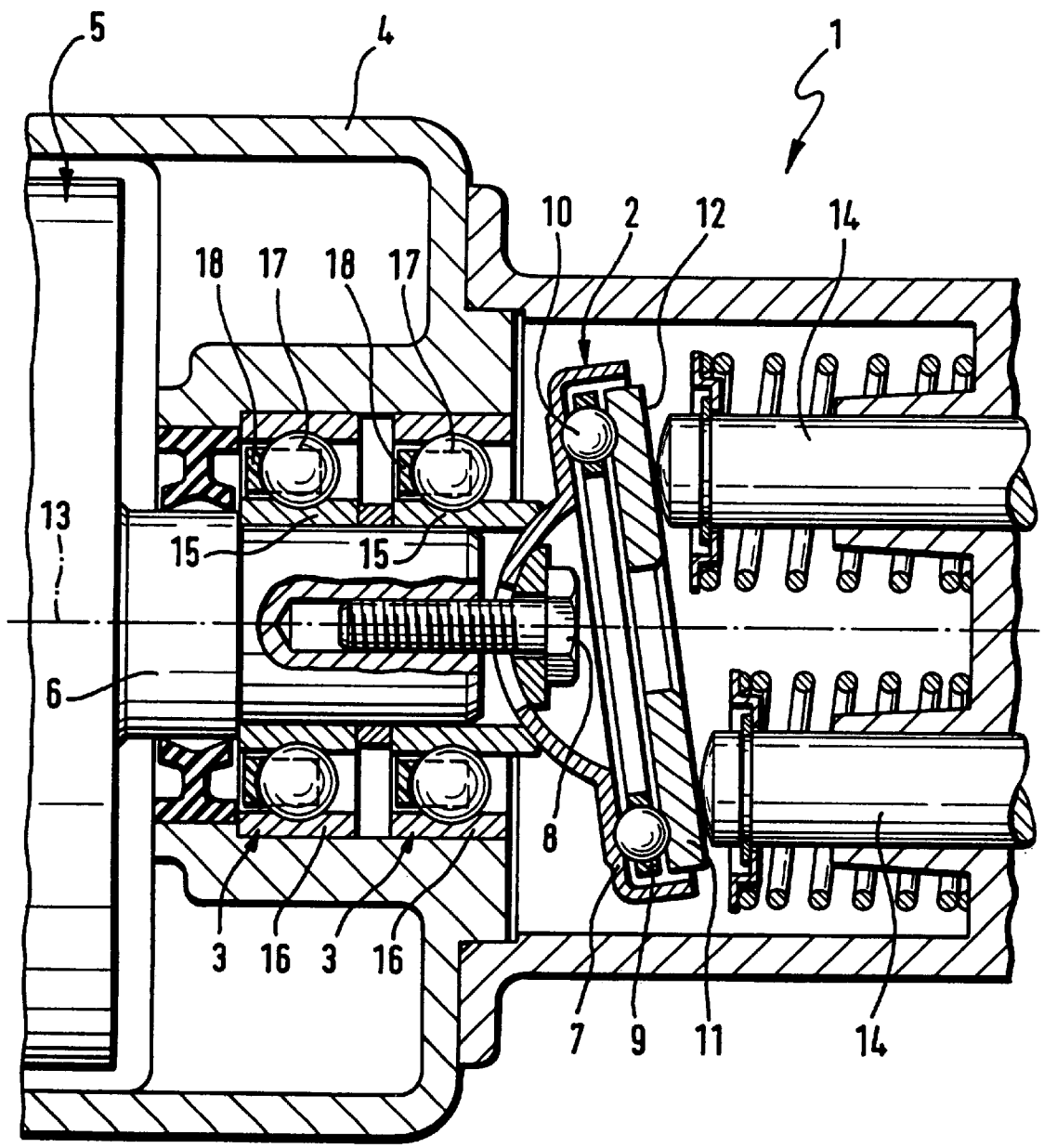
FIG. 1 shows a longitudinal section through a prior art axial piston pump in the region of the oscillating bearing.

FIG. 1 shows a prior art axial piston pump 1 in which an oscillating bearing 2 is mounted on two spaced-apart shaft bearings 3 in a housing 4. The oscillating bearing 2 can be driven by a shaft 6 connected to an engine 5. The oscillating bearing 2 comprises a first, bellied bearing ring 7 which is connected to the shaft 6 by a screw connection 8. The rolling elements 10 which are arranged in a cage 9 support a second bearing ring 11 of the oscillating bearing 2 whose end face 12 is inclined at a defined angle to a central vertical line of the longitudinal axis 11 of the shaft 6 and forms a contact surface for the pistons 14.

Each of the shaft bearings 3 is made up of an inner ring 15, an outer ring 16 and associated bearing balls 17 which are arranged in a cage 18. The rotation of the shaft 6 caused by the engine 5 is converted into a reciprocating motion of the pistons 14 by the screw connection 8, the first bearing ring 7 and the second bearing ring 11 of the oscillating bearing 2.

Figure 2:
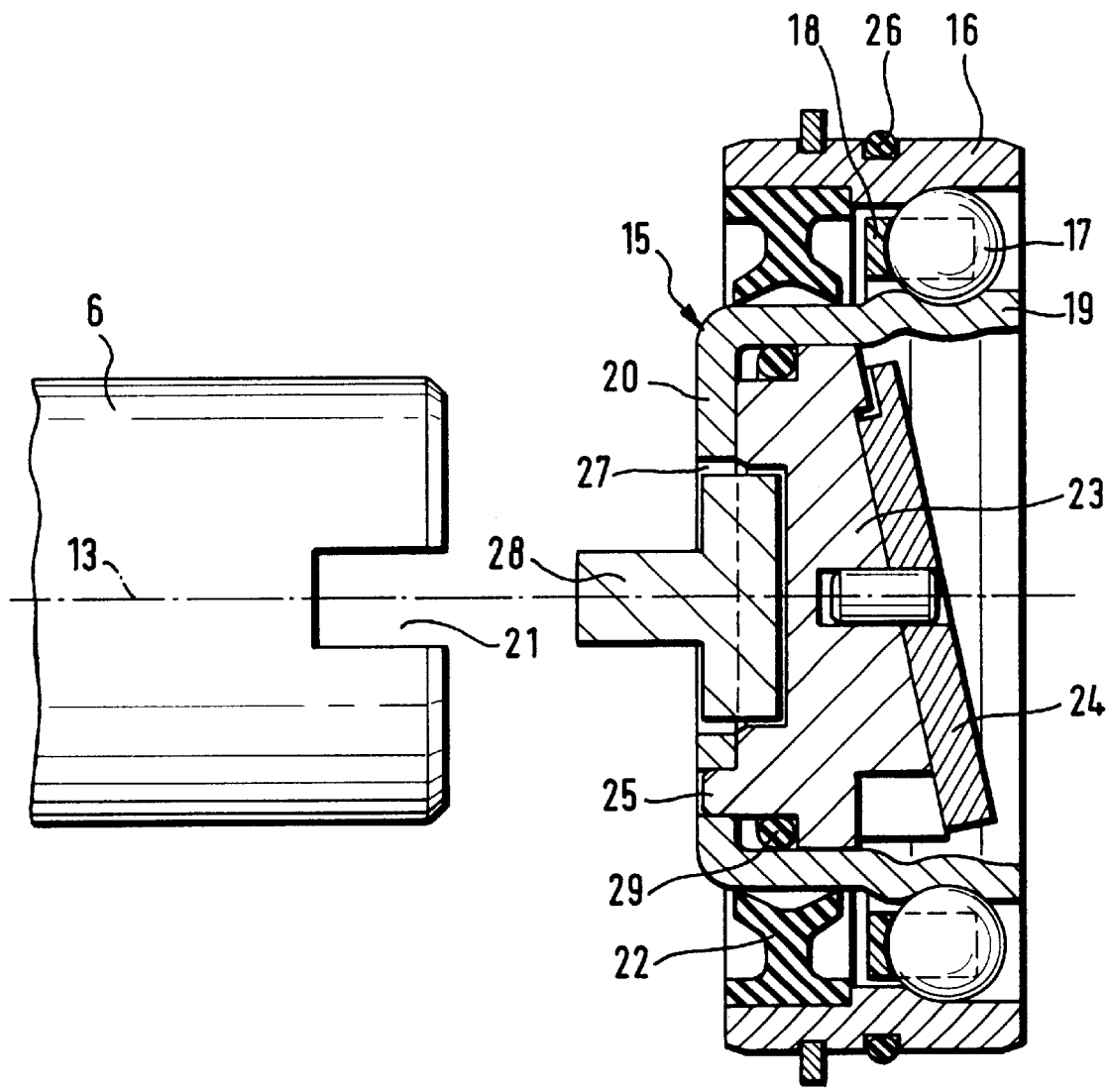
FIG. 2 shows a longitudinal section through an oscillating bearing of the invention, and an associated drive shaft.

The oscillating bearing arrangement of the invention shown in FIG. 2 comprises a chiplessly drawn inner ring 15 which is configured as a pot-shaped sheet metal part and comprises a tubular section 19 and a bottom 20 which closes the tubular section 19 at one end. The inner ring 15 is surrounded by the outer ring 16, and bearing balls 17 guided in a cage 18 roll between the two rings. A seal 22 arranged between the inner ring 15 and the outer ring 16 seals the bearing in the direction toward the engine.

According to the invention, a wobble plate 2 having a substantially trapezoidal shape in longitudinal section is arranged in the reception bore of the inner ring 15 and covered with a cover plate 24 which cooperates with the pistons 14 in a manner not shown. An anti-rotation device 25 is arranged between the wobble plate 23 and the inner ring 15 to prevent a rotation of the wobble plate 23 in the inner ring 15. The static sealing is achieved by two O-ring seals 26 and 29. Both the bottom 20 of the inner ring 15 and the wobble plate 25 comprise a recess 27 into which a coupling element 28 engages. At its other end, this coupling element 28 is connected to the shaft 6 through a further recess 21. The coupling element 28 can be configured, for instance, as a low-cost Oldham coupling and assures that the rotation of the shaft 6 caused by an engine 5 likewise causes a rotation of the inner ring 15 of the bearing which, finally, through the cover plate 24 of the wobble plate 23, leads to a reciprocating motion of the pistons 14.

If one replaces the shaft bearing 3 described in fig. 1 with the oscillating bearing of the invention, it becomes clear at a glance that a considerable shortening of the axial design space is achieved because one of the shaft bearings 3 can be dispensed with completely.

What is claimed is:

1. An oscillating bearing arrangement, for axial piston pumps (1) of a wobble plate type, comprising a shaft (6) connected for rotation about its longitudinal axis (13) to a wobble plate, the shaft (6) being coupled with a shaft bearing (3) arranged in a housing (4) and comprising an inner ring (15) and an outer ring (16), and oscillating driven elements (14) being spring-suspended against the wobble plate characterized in that the wobble plate (23) which is substantially trapezoidal-shaped in longitudinal section is arranged concentrically in a reception bore of the inner ring (15) of the shaft (3).

2. An oscillating bearing arrangement according to claim 1, characterized in that the shaft (6) is connected to the inner ring (15) and/or to the wobble plate (23) by a coupling element (28).

3. An oscillating bearing arrangement according to claim 1, characterized in that the inner ring (15) is configured as a pot-shaped sheet metal part made by non-chipping shaping and comprises a tubular section (19) which is parallel to the longitudinal axis (13) of the shaft (6) and comprises a ball race groove formed chiplessly therein, the tubular section (19) being closed at one end by a bottom (20) which comprises a recess (27) for the coupling element (28).

4. An oscillating bearing arrangement according to claim 1, characterized in that the outer ring (16) is configured as a sheet metal part which is made by non-chipping shaping and comprises a ball race groove formed chiplessly on its inner peripheral surface, and a sealing ring (22) is arranged between the inner ring (15) and the outer ring (16).

5. An oscillating bearing arrangement according to claim 1, characterized in that the wobble plate (23) comprises, on its end face facing bottom (20), a recess (27) for a coupling element (28), and, on its end face facing the driven elements (14), a cover plate (24).

6. An oscillating bearing arrangement according to claim 1, characterized in that the wobble plate (23) and/or a cover plate (24) are made of a metal or a plastic by machining, casting, sintering or injection molding.

7. An oscillating bearing arrangement according to claim 1, characterized in that an anti-rotation device (25) is arranged between the inner ring (15) and the wobble plate (23).

8. An oscillating bearing arrangement according to claims 1 characterized in that the axial piston pump (1) is used for direct injection of fuel, and the shaft (6) is a camshaft or an internal combustion engine.

* * * * *